DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 13, 1970

870 O.G. 394

T870,014

UNSATURATED POLYESTERS

Hugh J. Hagemeyer, Jr., Willard P. Gleason, and Alfred G. Robinson III, all of P.O. Box 2068, Longview, Tex. 75603

Filed Dec. 18, 1968, Ser. No. 784,930

Int. Cl. C08g *17/10*

U.S. Cl. 260—75

No Drawing. 12 Pages Specification

Unsaturated polyesters having good heat distortion temperatures, flexural strengths, and cure properties are prepared in a two step process comprising (A) preparing a linear polyester by condensing a phthalic acid or esterifiable derivative thereof and a glycol component consisting of ethylene glycol and 2,2-dimethyl-1,3-propanediol, 2,2,4-trimethyl-1,3-pentanediol, or a mixture thereof and (B) reacting said linear polyester and an unsaturated aliphatic dicarboxylic acid or an esterifiable derivative thereof to form said unsaturated polyester.